May 5, 1925.
P. BURKE
POWER SHOVEL
Filed May 26, 1924
1,536,609
3 Sheets-Sheet 1
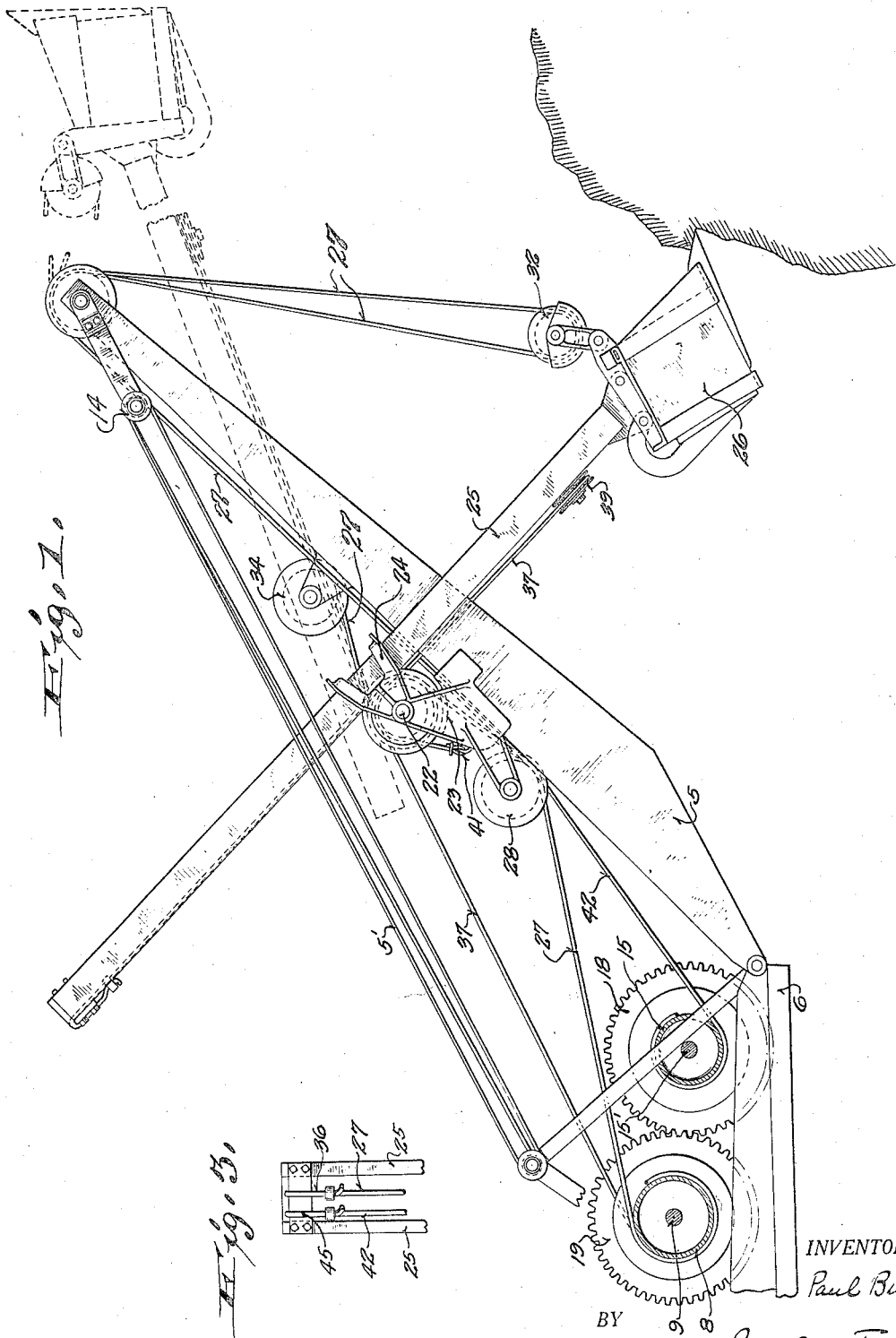
INVENTOR.
Paul Burke
BY
Quarles & French
ATTORNEYS May 5, 1925.

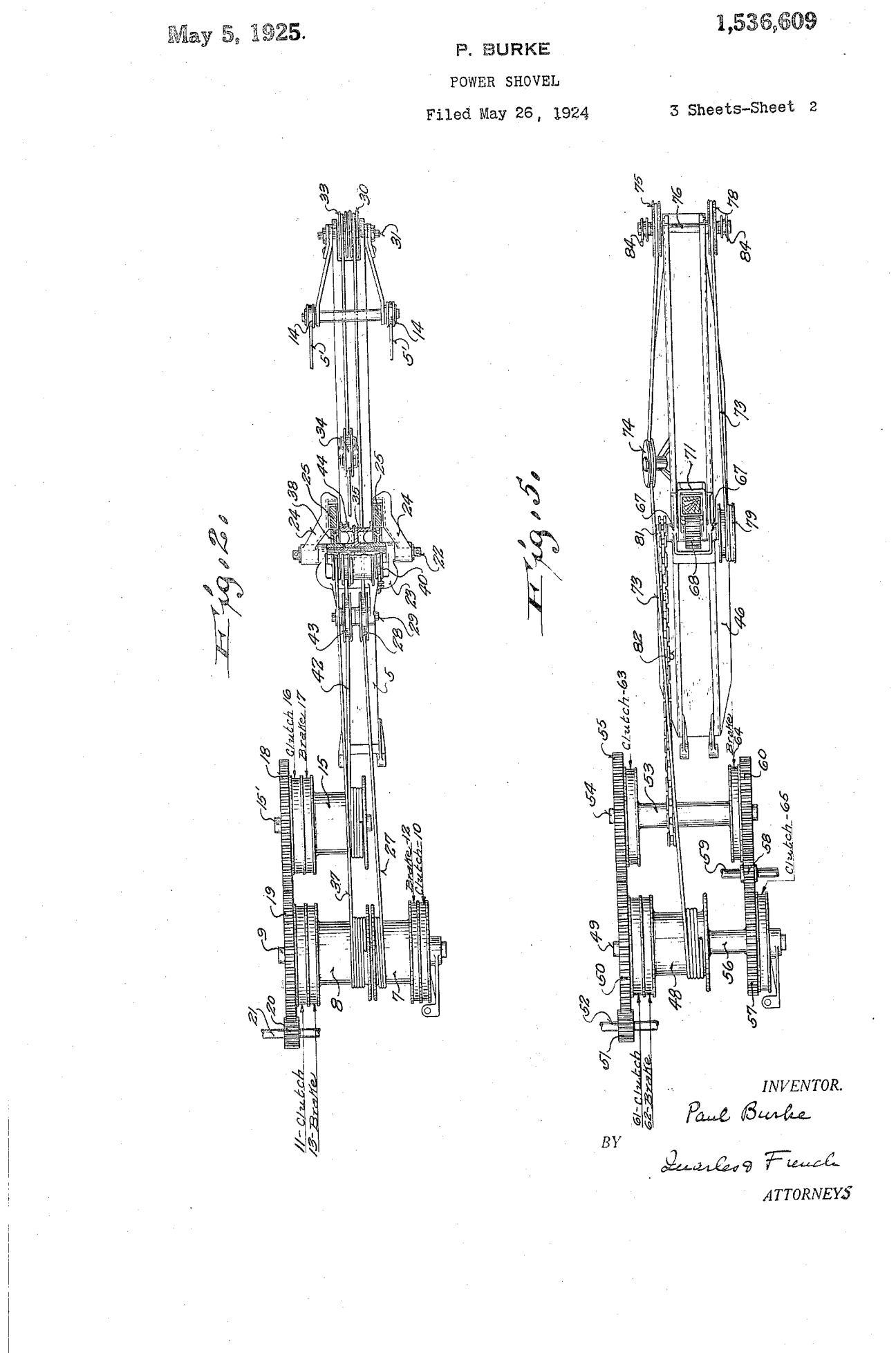

P. BURKE

POWER SHOVEL

Filed May 26, 1924

INVENTOR.
Paul Burke
BY
Quarles & French
ATTORNEYS

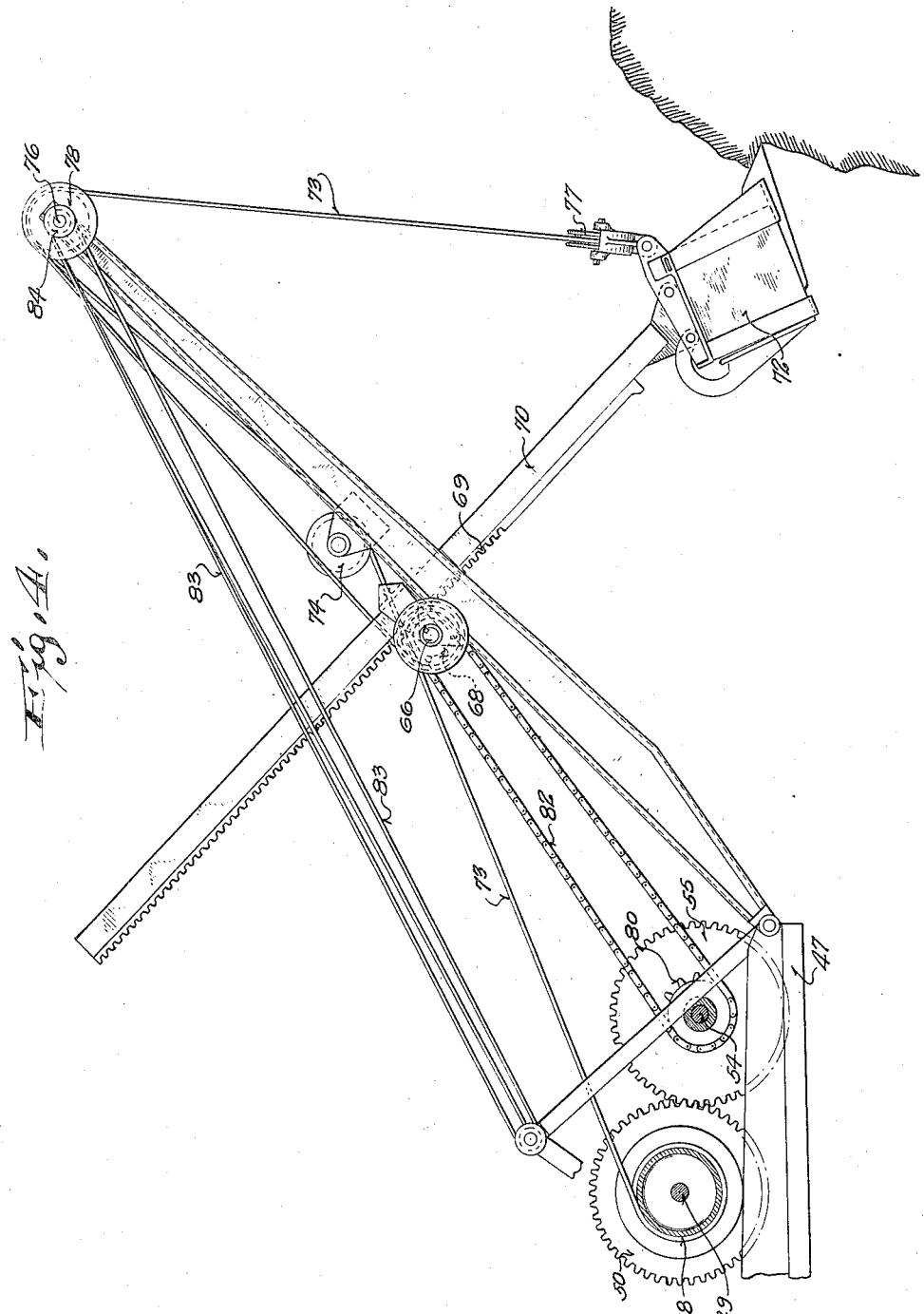

Patented May 5, 1925.

1,536,609

UNITED STATES PATENT OFFICE.

PAUL BURKE, OF GREEN BAY, WISCONSIN, ASSIGNOR TO NORTHWEST ENGINEERING COMPANY, OF GREEN BAY, WISCONSIN, A CORPORATION OF WISCONSIN.

POWER SHOVEL.

Application filed May 26, 1924. Serial No. 716,000.

*To all whom it may concern:*

Be it known that I, PAUL BURKE, a citizen of the United States of America, and resident of Green Bay, in the county of Brown and State of Wisconsin, have invented new and useful Improvements in Power Shovels, of which the following is a description, reference being had to the accompanying drawings, which are a part of this specification.

The invention relates to excavating machines.

In some types of power shovels using one source of power for both hoisting and thrusting, provision is made for positively thrusting the dipper and its handle outwardly, as by a gear drive or a separate cable, without any cooperative association therewith by the hoisting cable which is a separate unit. While such mechanisms permit positive outward thrust of the stick regardless of its position relative to the boom and allow thrusting out to the extreme position, it is to be noted that whatever power is devoted to thrusting effort will involve a simultaneous and corresponding reduction in the power then available for hoisting; that is to say, assume a dipper lowered onto the material to be excavated, and being moved through the material, the resistance encountered being such as to take nearly all the power of the engine, no thrusting taking place, the dipper moving in substantially the arc of a circle; when, as is usually the case, it becomes necessary to thrust further into the bank power must be subtracted from hoisting, which results in a corresponding reduction in the force at the dipper lip and teeth for cutting through the material. This means a reduction in the size of the bite must be made, or perhaps the dipper will have to be returned part way to the starting point and a new bite started because of the demands on the power plant which, as a practical matter, is generally not provided with excess power. This naturally slows up the digging operation and produces poor and unsatisfactory operation where the digging conditions are difficult.

With that type of rope-thrusting shovel in which thrusting is obtained by or in connection with the hoisting cable, the single power plant need not be overpowered since the thrusting effort or the restraining effort from outward motion of the stick occasions no reduction in the net digging effort and the energy balance is maintained, but with such constructions as now known, where the stick is long, it cannot be projected beyond the boom when above the horizontal for dumping because forces due to the weight of the bucket and the inward thrust exerted by said hoisting cable prevent this. Furthermore, with such constructions a rapid longitudinal shaking movement cannot be readily imparted to the stick and dipper, which motion is sometimes desirable for the purpose of dislodging a rock or other object with which the dipper and its teeth may be engaged during digging.

The object of the invention is to retain the positive outward thrusting afforded by a reversible chain drive or its cable equivalent without loss of power due to thrusting, by association therewith of a hoisting cable having a thrusting effort on said handle.

The invention further consists in the several features hereinafter set forth and more particularly defined by claims at the conclusion hereof.

In the drawings:

Fig. 1 is a side elevation view of an excavating shovel embodying the invention;

Fig. 2 is a plan view thereof, parts being shown in section;

Fig. 3 is a detail rear view of the upper end of the stick;

Fig. 4 is a side elevation view of another shovel embodying the invention;

Fig. 5 is a plan view of the shovel shown in Fig. 4 with the stick shown in section.

In Figs. 1, 2 and 3 of the drawings I have shown a rackless rope-thrusting shovel in which the numeral 5 designates the boom, which may be of any suitable construction, vertically pivotally attached at its lower end to the rotating base 6 of the machine, which base is of well-known construction. The drums 7 and 8 may be of any well-known construction and are loose on a shaft 9 to which they are adapted to be drivingly connected by clutches 10 and 11 of any suitable construction and said drums are also equipped with brakes 12 and 13 of any suitable construction to control their operation. The boom is adapted to be raised or lowered and held in various positions of vertical adjustment by any well-known means, such as cables 5′ connecting pulleys 14 supported from the outer end of the boom to parts on the rotating base. A drum 15 similar to the drum 8 is loose on a shaft 15′ suitably mounted on the base 6 and has a clutch 16 for connecting it with the shaft 15′ for driving and a brake 17 to control its operation. These drums are adapted to be connected to a source of power in any suitable manner and in the present instance I have shown a gear 18 keyed to the shaft 15′ and meshing with a gear 19 keyed to the shaft 9 which meshes with a drive pinion 20 on a shaft 21 adapted to be connected in any suitable manner to a prime mover on the base 6. From this it will be noted that the gears 19 and 18 on their shafts 9 and 15′ are rotating continuously with said shafts and that the drum 7 may be connected to the power drive through the clutch 10, the drum 8 through the clutch 11 and the drum 15 through the clutch 16.

A shipper shaft 22 is secured in the arms of a casting 23 on the boom 5 and the saddle blocks or stick guides 24 are loose on said shaft. The dipper stick 25 is preferably of the divided type, that is, composed of two sections, each being slidably mounted between one of the saddle block 24 and a roller on the boom and to swing with said blocks about the shaft 22. The dipper or shovel 26 may be of any suitable construction and is mounted, as usual, at the lower end of the stick. The hoisting and thrusting cable 27, wound on the drum 7 and secured thereto, passes therefrom under a guide sheave 28 on a shaft 29 carried by the dipper sticks, thence between the dipper sticks, thence over a sheave 30 on a shaft 31 at the outer end of the boom, thence downwardly through a padlock sheave 32 pivotally connected to the dipper, thence upwardly over a sheave 33 on the shaft 31, thence backwardly under the guide sheave 34 on the boom and once or more around a drum or sheave 35 loose on the shaft 22, and thence upwardly between the parts of the stick to the upper end of the stick where it is dead-ended at 36.

The back haul cable 37, wound on the drum 8 and secured thereto, passes therefrom over a guide sheave 38 on the shaft 22 down to and around a guide sheave 39 journalled on the lower end of the stick, and thence upwardly over a guide sheave 40 on the shaft 22 and is dead-ended at 41 to the casting 23 and thence to the boom. The guide sheaves 38 and 40 form the rollers previously mentioned in connection with the saddle blocks 22 and said sheaves together with the sheave 35 are loose on the shipper shaft 22.

An outward thrust cable 42, wound on the drum 15 and secured thereto, passes therefrom under the guide sheave 43 on the shaft 29 and under a sheave 44 on the shaft 22, here shown as formed integral with the drum 35, and thence upwardly to the upper end of the dipper stick where it is dead-ended at 45.

The operation of the above described construction is as follows: When the drum 8 is prevented from turning by its brake 13, thereby holding the cable 37, and the cable 27 is pulled in by winding it up on the drum 7, the dipper moves approximately in the arc of a circle of which the shipper shaft is the center. The dipper having been drawn in toward the machine and lowered upon the material to be excavated and with the brake 13 on the drum 8 released to allow cable 37 to pay out, cable 27 is wound in causing the dipper to swing relative to its pivot on the shipper shaft and at the same time shift outwardly with respect to the boom through the saddle blocks by reason of the pulling effect exerted on the upper end of the stick by that portion of the hoisting cable which extends from the drum 35 on the shipper shaft to the upper end of the stick, it being noted that this run of the cable becomes shortened as the hoisting cable is pulled in. This outward shifting of the stick crowds the dipper outwardly into the material to be excavated. If, during this digging operation, it is desired to increase the outward thrusting force, the clutch 16 is thrown in, thereby connecting the drum 15 with the power source and the cable 42 is wound in causing it to pull downwardly upon the upper end of the dipper stick to effect the increase in outward thrusting. Furthermore, as the dipper under the action of the hoisting cable 27 is swung upwardly beyond a substantially horizontal position the tendency of the stick and the dipper to shift inwardly due to the tension in the hoisting line 27 and the weight of the dipper and its handle may be prevented by applying the brake 17 to the drum 15, or it may be counteracted and the dipper thrust farther out by connection of the drum 15 with the source of power through the throwing in of the clutch 16 so that the cable 42 will operate to move a relatively long stick outwardly after it is raised so that the dipper will be moved to a point beyond the upper end of the boom in position for dumping its load.

In place of the brake 17 on the drum 15 I may use an automatic brake associated with the drum 33 in a manner shown and described in my copending application Serial No. 695,479, filed Feb. 27, 1924, which would act to restrain the inward shifting movement of the stick but the actual outward thrusting would be accomplished by the operation of the drum 15. Thus, the cable 42 assists in thrusting the stick outwardly during digging and in thrusting the stick outwardly during hoisting and preventing its tendency to shift inwardly under the conditions above described.

If it is desired to move the dipper farther in, that is, retract it, releasing the clutches 10 and 16 for the drums 7 and 15 and releasing the brake 17 and throwing in the clutch 11 for the drum 8 so as to connect said drum with the source of power and rotating it in the direction to pull in on the back haul cable 37 produces this effect. Thus, by the proper manipulation and control of the lines or cables 27, 37 and 42 through the rotation or braking of the drums 7, 8 and 15, any desired swinging or thrusting movement of the dipper and its handle may be effected, and it is also to be noted that the stick is effectually prevented from shifting inwardly when in a raised or extended position and may be positively shifted outwardly when in such position.

In Figs. 4 and 5 I have shown a rack drive shovel in which the numeral 46 designates the boom, which may be of any suitable construction, vertically pivotally attached at its lower end to a rotating base 47 of the machine, which base is of well known construction. The hoisting drum 48 is loosely mounted on a shaft 49 suitably supported on the rotating base in any well-known manner, and a gear 50 is keyed to said shaft and meshes with a drive pinion 51 on a shaft 52 which is driven in any suitable manner from a prime mover, not shown, on the rotating base. A member 53, here shown in the form of a drum, is loosely mounted on a shaft 54 suitably supported on the rotating base in any well-known manner, and a gear 55 is keyed to the shaft 54 and meshes with a gear 50. A member 56, here shown in the form of a drum, is loosely mounted on the shaft 49 and has a gear 57 formed integral therewith meshing with an idler pinion 56 on a transmission shaft 59, which pinion meshes with a gear 60 formed integral with the drum 53. The hoisting drum 48 is equipped with a clutch 61, of any suitable construction, for connecting it to be driven by the shaft 49 and with a suitable brake 62. The member 53 is equipped with a clutch 63 of any suitable construction for connecting it to be driven by the shaft 54 and with a suitable brake 64. The drum 56 is equipped with a clutch 65, of any suitable construction, for connecting it to be driven by the shaft 49. Thus, the drum 48 and the member 56 may be independently connected with the source of power through their clutches 61 and 65, and the member 53 may be driven in one direction when connected by the clutch 63 to the shaft 54 and in the opposite direction through the gearing connection 57, 58 and 60, it being noted that the clutch 65 may be associated directly with the member 53 and the gear 57 be made fast to the shaft 49 without changing the operation.

A shipper shaft 66 is journalled in bearing brackets 67 on the boom and carries a pinion or gear 68 meshing with a rack 69 affixed to the dipper handle or stick 70 which is slidably mounted in a yoke 71 mounted to swing on and about the shipper shaft 66. The dipper or shovel 72 may be of any suitable construction and is mounted, as usual, at the lower end of the stick. A hoisting and outward thrusting cable 73, wound around the drum 48 and secured thereto, passes therefrom under a guide sheave 74 on the boom, thence over a sheave 75 loose on the shaft 76 at the outer end of the boom, thence downwardly through a transversely disposed padlock sheave 77 pivotally connected to the dipper, thence upwardly over a guide sheave 78 loose on the shaft 76, thence backwardly to and around a drum 79 keyed to the shaft 66, and the end of said cable is dead-ended on said drum. The member or drum 53 has a sprocket wheel 80 formed integral therewith or secured thereto, which is operatively connected to the sprocket wheel 81 keyed to the shaft 66 by a chain 82.

The boom is adapted to be raised or lowered and held in various positions of vertical adjustment by well-known means, such as cables 83 connecting pulleys 84 to parts on the rotating base.

With this last-described construction, it will be noted that when the drum 53 is prevented from rotating by its brake 64 and the clutch 65 is disengaged and the clutch 61 for the drum 48 is thrown in, thereby connecting said drum with the source of power to turn the same to pull in on the cable 73 the dipper will swing approximately in the arc of a circle of which the shipper shaft 66 is the center. The dipper having been drawn in toward the machine and lowered upon the material to be excavated and with the brake 64 on member 53 released and with the drum 48 connected to the shaft 49 through the clutch 61, cable 73 is wound in causing the dipper pivoted about the shaft 66 to swing relative thereto and at the same time, due to the tension produced in said cable, causing the drum 79 to revolve in a clockwise direction and thus rotate the shaft 56 and its pinion 68 through the rack 69 to move the dipper stick 70 lengthwise and outwardly, producing an outward thrusting of the dipper, thus crowding it outwardly into the material to be excavated. If, during this digging operation, it is desired to increase the thrusting force the clutch 63 for the member 53 is thrown in thereby connecting the member 53 with the source of power through gears 51, 50 and 55 and driving the shipper shaft 66 through the sprockets 80 and 81 and the chain 82 in the same direction as the pull on the cable 73, which causes a turning of the shaft 66 and hence causing additional power to be imparted to the shaft 66 to increase the outward thrusting effect.

Furthermore, as the dipper under the action of the hoisting cable is swung upwardly beyond a substantially horizontal position, the tendency of the dipper and its stick to shift inwardly, due to the tension in the hoisting cable and the weight of the dipper and its stick, may be prevented by the release of clutch 63 and the application of brake 64 to the shaft 53 to hold the gear 68 against turning, and by connecting the member 53 with the source of power through the clutch 63 and the gears 51, 50 and 55 the positive outward thrust of the additional drive thus furnished will move the stick outwardly against the forces tending to shift it inwardly, as previously mentioned, so that the dipper will be moved to bring the padlock sheave 77 substantially beyond the point of the boom and the stick substantially above the horizontal. Thus, the drive from the drum 53 assists in thrusting the stick outwardly during digging and in thrusting the stick outwardly during hoisting, or preventing its tendency to shift inwardly under the conditions above described. If it is desired to retract the dipper or move it in toward the boom, throwing out clutches 61 and 63 and throwing in clutch 65 causes the drive from the source of power through the gears 51, 50, 57, 58 and 60, member 53, sprockets 80, 81 and chain 82 to turn the shaft 66 in a counterclockwise direction, whereby the pinion acts on the rack to move the stick inward or upward relative to the boom.

From the foregoing description it will be noted that I have provided a construction in which the dipper and its handle may be positively thrust outwardly or inwardly during digging and that the association of the hoisting cable with the outward thrusting means prevents loss of power due to thrusting.

I desire it to be understood that this invention is not to be limited to any specific form or arrangement of parts except in so far as such limitations are specified in the claims or necessitated by the prior art.

What I claim as my invention is:

1. In an excavating machine, the combination with a supporting boom, of a dipper and dipper handle mounted thereon for swinging and shifting movements relative thereto, a hoisting and thrusting cable associated with the dipper and its handle for hoisting the dipper and crowding it outwardly into the material to be excavated, and separately controlled means also operable for moving the dipper and its handle outwardly conjointly with the operation of said hoisting cable.

2. In an excavating machine, the combination with a supporting boom, of a dipper and dipper handle mounted thereon for swinging and shifting movements relative thereto, a hoisting and thrusting cable associated with the dipper and its handle for hoisting the dipper and crowding it outwardly into the material to be excavated, separately controlled means also operable for moving the dipper and its handle outwardly conjointly with the operation of said hoisting cable and to shift the dipper and its handle inwardly.

3. In an excavating machine, the combination with a supporting boom, of a dipper and dipper handle mounted thereon for swinging and shifting movements relative thereto, a hoisting and thrusting cable associated with the dipper and its handle for hoisting the dipper and crowding it outwardly into the material to be excavated, separately controlled means also operable for moving the dipper and its handle outwardly conjointly with the operation of said hoisting cable and operable independently to shift the dipper and its handle inwardly.

4. In an excavating machine, the combination with a supporting boom, of a dipper and dipper handle mounted thereon for swinging and shifting movements relative thereto, a hoisting and thrusting cable associated with the dipper and its handle for hoisting the dipper and crowding it outwardly into the material to be excavated, separately controlled means also operable for moving the dipper and its handle outwardly conjointly with the operation of said hoisting cable, and a separately controlled cable for shifting the dipper and its handle inwardly.

5. In an excavating machine, the combination with a supporting boom, of a dipper and dipper handle mounted thereon for swinging and shifting movement relative thereto, a hoisting and thrusting cable associated with said dipper and dipper handle for hoisting the dipper and thrusting it outwardly, separately controlled means acting in conjunction with said cable for increasing the outward thrusting effort, and means associated with said last-named means for holding it against actuation to prevent inward shifting of the dipper and its handle.

6. In an excavating machine, the combination with a supporting boom, of a dipper and its handle mounted thereon to swing and shift lengthwise relative thereto, a hoisting drum and cable mounted on said drum and associated with the dipper and its handle for hoisting the dipper and thrusting it outwardly through tension exerted in said cable, another drum and a cable associated with said drum and the dipper handle and independently controlled for producing an outward thrusting effort, a back haul drum, and a back haul cable associated with said drum and the dipper handle for moving the dipper and its handle inwardly.

7. In an excavating machine, the combination with a supporting boom, of a dipper and dipper handle mounted thereon for swinging and lengthwise shifting movement relative thereto, a hoisting and thrusting cable associated with the dipper and dipper handle for hoisting the dipper and thrusting it outwardly, a separately controlled cable acting in conjunction with said hoisting cable for outward thrusting, and means for holding said cable to prevent inward shifting of the dipper and its handle.

8. In an excavating machine, the combination with a supporting boom, of a dipper and dipper handle mounted thereon for swinging and shifting movements relative thereto, a hoisting and thrusting cable associated with the dipper and its handle for hoisting the dipper and crowding it outwardly into the material to be excavated, independently operable means for shifting the dipper and its handle, means for moving said last-named means in one direction for shifting the dipper and its handle outwardly in conjunction with said hoisting cable, and means for moving said last-named means in another direction for shifting the dipper and its handle inwardly.

9. In an excavating machine, the combination with a supporting boom, of a dipper and dipper handle mounted thereon for swinging and shifting movements relative thereto, a hoisting and thrusting cable associated with the dipper and its handle for hoisting the dipper and crowding it outwardly into the material to be excavated, means also operable for moving the dipper and its handle outwardly conjointly with the operation of said hoisting cable, and a separate control for the inward movement of the dipper and its handle.

10. In an excavating machine, the combination with a supporting boom, of a dipper and dipper handle mounted thereon to move lengthwise and swing with respect thereto, mechanism for positively moving the dipper and its handle lengthwise in both directions, and a dipper-hoisting cable associated with said mechanism for conjoint outward thrusting therewith during outward lengthwise movement of said dipper and dipper handle.

11. In an excavating machine, the combination with a supporting boom, of a dipper and dipper handle mounted thereon for swinging and shifting movements relative thereto, of cable means for hoisting the dipper and thrusting it outwardly during hoisting, and separately controlled means associated with said cable means and operable for moving the dipper and its handle outwardly conjointly with the said cable means.

12. In an excavating machine, the combination with a supporting boom, of a shipper shaft, a dipper and divided dipper handle mounted on said shaft to swing therewith and move lengthwise relative thereto, hoisting and thrusting means associated with the dipper and its handle including a hoisting drum and a cable passing from said drum between the parts of said dipper handle and beneath said shipper shaft.

In testimony whereof, I affix my signature.

PAUL BURKE.